United States Patent
Trapp et al.

(10) Patent No.: US 8,154,837 B2
(45) Date of Patent: Apr. 10, 2012

(54) CIRCUIT ARRANGEMENT AND METHOD FOR MONITORING WHEEL SPEED SENSORS IN A MOTOR VEHICLE CONTROL DEVICE

(75) Inventors: René Trapp, Föckelberg (DE); Frank Michel, Höhe (DE)

(73) Assignee: Continental Teves AG & Co, OHG, Frankfurt (DE)

( * ) Notice: Subject to any disclaimer, the term of this patent is extended or adjusted under 35 U.S.C. 154(b) by 314 days.

(21) Appl. No.: 12/063,456

(22) PCT Filed: Aug. 10, 2006

(86) PCT No.: PCT/EP2006/065211
§ 371 (c)(1),
(2), (4) Date: Mar. 26, 2010

(87) PCT Pub. No.: WO2007/017523
PCT Pub. Date: Feb. 15, 2007

(65) Prior Publication Data
US 2010/0182725 A1 Jul. 22, 2010

(30) Foreign Application Priority Data

Aug. 10, 2005 (DE) .......................... 10 2005 038 054
Aug. 10, 2006 (DE) .......................... 10 2006 037 619

(51) Int. Cl.
*H02H 3/08* (2006.01)
*H02H 9/02* (2006.01)
*H02H 3/00* (2006.01)

(52) U.S. Cl. ......................................... 361/93.1; 361/87
(58) Field of Classification Search ................. 361/93.1, 361/87
See application file for complete search history.

(56) References Cited

U.S. PATENT DOCUMENTS

| 5,795,039 | A | 8/1998 | Fennel et al. | |
|---|---|---|---|---|
| 6,297,673 | B1 | 10/2001 | Walther | |
| 6,552,531 | B1 | 4/2003 | Fey et al. | |
| 7,248,991 | B2 | 7/2007 | Goebel et al. | |
| 2004/0252435 | A1* | 12/2004 | Ishikawa et al. | 361/100 |
| 2005/0225164 | A1* | 10/2005 | Obai | 303/3 |

FOREIGN PATENT DOCUMENTS

DE 10022457 11/2001

* cited by examiner

*Primary Examiner* — Dharti Patel

(57) ABSTRACT

Circuit arrangement (2,3,4,5) in an electronic control device which is connected to at least one wheel speed sensor channel (6,7,8,9) transmitting wheel speed information, in particular in the form of a current signal, the circuit arrangement (2,3, 4,5) having at least one monitoring module (U1,U2,U3,U4) for the at least one wheel speed sensor channel (6,7,8,9), where this at least one monitoring module (U1,U2,U3,U4) is suitable for monitoring an excess current fault on at least one wheel speed sensor channel (6,7,8,9), in which, when an excess current fault is detected by the at least one monitoring module (U1,U2,U3,U4) the respective wheel speed sensor channel(s) (6,7,8,9) is/are blocked by a blocking circuit (10, 11,12,13) of the circuit arrangement (2,3,4,5), and/or in which the circuit arrangement (2,3,4,5) causes the blocking of the respective wheel sensor channel or channels (6,7,8,9) from outside the circuit arrangement (2,3,4,5).

14 Claims, 1 Drawing Sheet

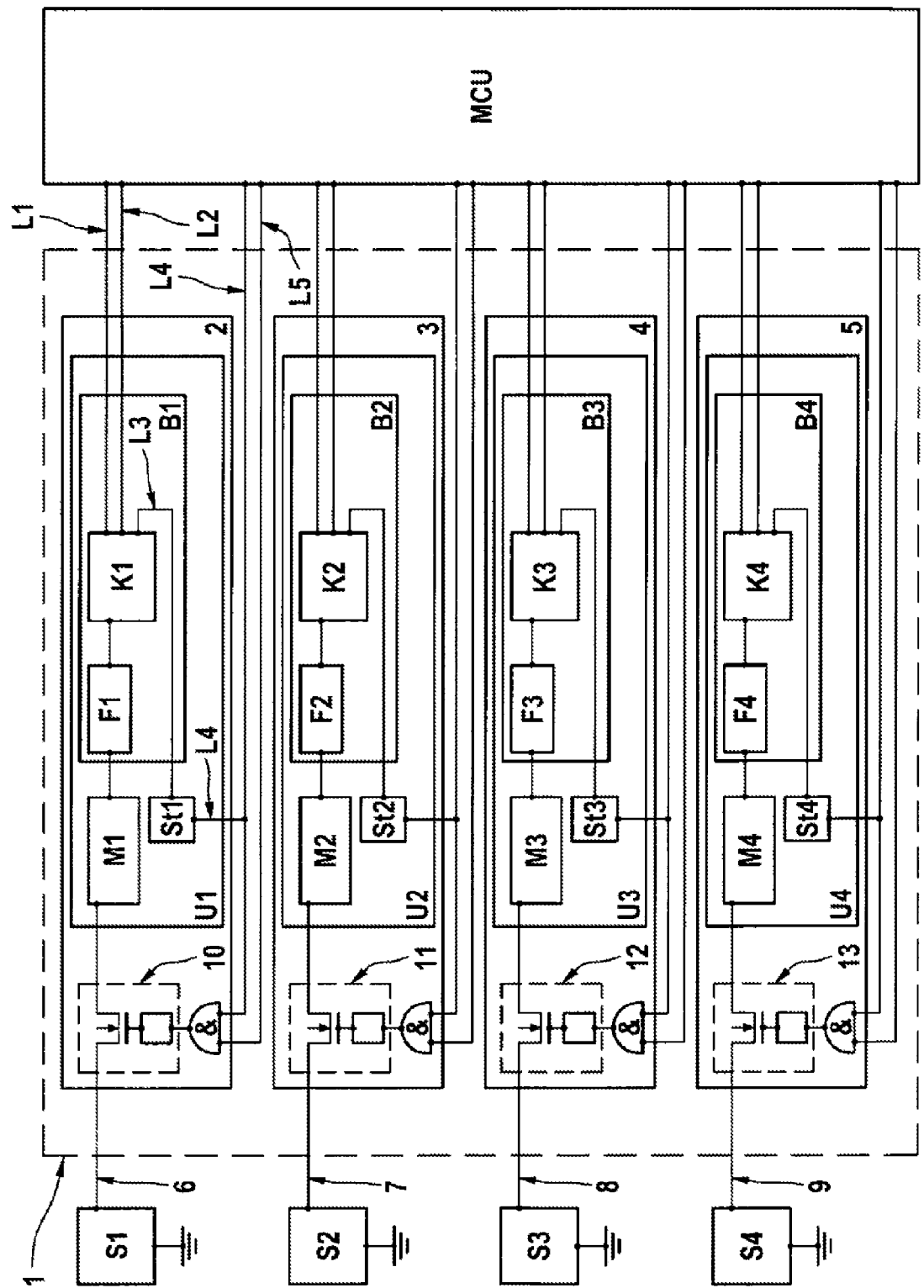

CIRCUIT ARRANGEMENT AND METHOD FOR MONITORING WHEEL SPEED SENSORS IN A MOTOR VEHICLE CONTROL DEVICE

This application is the U.S. national phase of international application PCT/EP2006/06511 filed Aug. 10, 2006, which designated the U.S. and which claims the benefit of priority of German Patent Application Number 10 2006 037 619.6 filed Aug. 10, 2006 and German Patent Application Number 10 205 038 054.9 filed Aug. 10, 2005. The contents of each of the aforementioned documents are incorporated herein in their entirety.

BACKGROUND OF THE INVENTION

The present invention relates to a circuit arrangement having an electronic control device which is connected to at least one wheel speed sensor channel (6,7,8,9) transmitting wheel speed information, in particular in the form of a current signal, where the circuit arrangement (2,3,4,5) is provided with at least one monitoring module (U1,U2,U3,U4) for the at least one wheel speed sensor channel (6,7,8,9), said at least one monitoring module (U1,U2,U3,U4) being suited for monitoring an excess current fault on at least one wheel speed sensor channel; a method for monitoring and deactivating at least one wheel speed sensor where the at least one wheel speed sensor (S1,S2,S3,S4) is connected to the at least one circuit arrangement via the wheel speed sensor channel; and the utilization of the circuit arrangement and the method.

Circuit arrangements serving for processing the signals for wheel speed sensors are referenced in which the sensor currents are limited, especially in the case of excess currents. Said excess currents on sensor channels may result, among other things, from short circuits or from undesired interventions of the power supply, e.g. due to isolation defects.

Publication WO 00/22441 suggests a circuit arrangement serving for processing the signals for a wheel speed sensor provided with a circuit element for limiting the current. In case excess currents or inadmissibly high currents are detected on a wheel speed sensor channel, the current on said sensor channel is limited. Even though current limitation guarantees a certain protection of the electronic components, said components, especially integrated circuits, heat up to a relatively high degree due to fault currents. This lost heat has to be dissipated by adequate means, as e.g. cooling plates and/or fans. However, the lost heat can also stealthily damage the electronic components, particularly the integrated circuits. This possibility is in particular imminent, if e.g. an excess current fault has been detected by the motor vehicle control device, the corresponding function is no longer available and the driver has been informed by a warning lamp of the existence of a defect, but he still decides to travel a longer way or to continue a longer journey, respectively.

It is the object of the invention to describe a circuit arrangement and a method which detect excess currents in sensor channels and avoid the occurrence of such excess currents over a long period of time.

SUMMARY OF THE INVENTION

This object is achieved by a circuit arrangement (2,3,4,5) in an electronic control device which is connected to at least one wheel speed sensor channel (6,7,8,9) transmitting wheel speed information, in particular in the form of a current signal, where the circuit arrangement (2,3,4,5) is provided with at least one monitoring module (U1,U2,U3,U4) for the at least one wheel speed sensor channel (6,7,8,9), said at least one monitoring module (U1,U2,U3,U4) being suited for monitoring an excess current fault on at least one wheel speed sensor channel (6,7,8,9). When the at least one monitoring module (U1,U2,U3,U4) detects an excess current fault, the corresponding wheel speed sensor channel(s) (6,7,8,9) is/are blocked by a blocking circuit (10,11,12,13) of the circuit arrangement (2,3,4,5), and/or that the circuit arrangement (2,3,4,5) provides for blocking the corresponding wheel speed sensor channel(s) (6,7,8,9) from outside the circuit arrangement (2,3,4,5). The object is also achieved by a method for monitoring and deactivating at least one wheel speed sensor (S1,S2,S3,S4) with a circuit arrangement (2,3, 4,5). The at least one wheel speed sensor (S1,S2,S3,S4) is connected to the at least one circuit arrangement via the wheel speed sensor channel (6,7,8,9). At least one status signal of the corresponding status driver stage (St1,St2,St3,St4) of the at least one circuit arrangement (2,3,4,5) is evaluated by an electronic data processing unit (MCU) which, in particular from a structural point of view, is separated from the circuit arrangement (2,3,4,5) and is designed for executing programs, where in case that the at least one status signal within at least one defined period of time and/or a by means of a defined number of control cycles identifies an excess current fault, the electronic data processing unit (MCU) provides for this/these wheel speed sensor(s) (S1,S2,S3,S4) and/or all wheel speed sensors (S1,S2,S3,S4) being deactivated, in particular by that the at least one blocking circuit (10,11,12,13) of the at least one wheel speed sensor channel(s) (6,7,8,9) is activated in such a way that the at least one wheel speed sensor channel (6,7,8,9) is blocked.

The invention is based on the idea of using at least one circuit arrangement in an electronic control device for blocking at least one wheel speed sensor channel and/or causing the blocking of at least one wheel speed sensor channel from outside the circuit arrangement. The circuit arrangement according to the invention is connected to at least one wheel speed sensor channel transmitting wheel speed information, in particular as a current signal. The circuit arrangement according to the invention is provided with at least one monitoring module for the at least one wheel speed sensor channel, said at least one monitoring module being suited for monitoring an excess current fault on at least one wheel speed sensor channel, so that when an excess current fault is detected by the at least one monitoring module the respective wheel speed sensor channel(s) is/are blocked by a blocking circuit of the circuit arrangement and/or the circuit arrangement causes a blocking of the corresponding wheel speed sensor channel(s) from outside the circuit arrangement.

The method according to the invention utilizes in particular a circuit arrangement according to the invention, where at least one wheel speed sensor is connected to the circuit arrangement at least by way of the wheel speed sensor channel. Preferably at least one status signal of the respective status driver stage of the at least one circuit arrangement is evaluated by the electronic data processing unit (MCU) which is separated from the circuit arrangement especially from a structural point of view and is intended to execute programs, where the electronic data processing unit (MCU) causes the deactivation of said wheel speed sensor/s and/or the deactivation of all wheel speed sensors in case that the at least one status signal within at least one defined period of time and/or by means of a defined number of control cycles detects an excess current fault, in particular by that the at least one blocking circuit of the at least one wheel speed sensor channel(s) is controlled in such a way that the at least one wheel speed sensor channel is blocked. By these measures variations in the current amplitude of at least one wheel speed sensor channel can be filtered for the evaluation of an excess current so that in case of short current peak loads the at least one wheel speed sensor is not deactivated.

The advantage of the circuit arrangement and the method according to the invention is, among other things, that heating up caused by excess currents can be avoided as a result of interrupting the power supply. Thus, the power dissipation of the wheel speed sensors and of the circuits connected to them is reduced and consequently an overload, especially a stealthy damage can be avoided and/or additional cooling measures can be dispensed with.

Preferably at least one circuit arrangement is used for at least one wheel speed sensor of the motor vehicle. In particular one circuit arrangement is used for each wheel speed sensor existing in the motor vehicle, and said circuit arrangements are preferably arranged in an electric control device, and in a particularly preferred manner in an electronic power unit (PCU) of said control device. Alternatively either one circuit arrangement for all wheel speed sensors of the motor vehicle or two circuit arrangements for two wheel speed sensors of the motor vehicle at a time are used, where the detection and evaluation of the current for always one or all and/or at least one wheel speed sensor channel is provided and at least one wheel speed sensor is deactivated by the at least one circuit arrangement by blocking at least one corresponding wheel speed sensor channel.

It is advisable that the at least one circuit arrangement and/or at least one wheel speed sensor is provided with a temperature sensor, in particular an additional one, where the evaluation and detection of an excessive temperature is carried out essentially analogously to the evaluation and identification of an excess current and the circuit arrangement is provided in a particularly preferred manner with additional circuit elements and the respective at least one wheel speed sensor channel is blocked in case an excessive temperature is detected in the defined manner.

A transmission channel is defined as a signal line and/or a logical channel and/or an information channel, at least one part of the transmission channel being preferably provided as at least one signal line and another part of the transmission channel as a logical channel and/or information channel. In particular one transmission channel is realized as a bus system and/or as a signal line transmitting its information via a driver to a bus or a bus system. In this case a transmission channel can in a particularly preferred manner consist of any combination of at least one signal line and at least one logical channel and/or information channel and at least one bus and/or bus system.

A wheel speed sensor channel is defined as the channel connecting a wheel speed sensor with the motor vehicle control device. This channel transmits data of the wheel speed sensor to the motor vehicle control device and the power supply for the sensor is preferably provided via this channel from the motor vehicle control device. Preferably, this channel is a transmission channel, in particular a signal line, of a wheel speed sensor.

An electronic control device is preferably defined as a motor vehicle control device and/or the electronic control unit of a motor vehicle control system. Said electronic control device comprises in particular an electronic power unit (PCU) including, among other things, the power supply and the activation of the power electronics, and an electronic data processing unit (MCU) arranged in particular on another semiconductor, in which in a particularly preferred manner programs for regulating and/or controlling a brake system are executed.

It is advisable that the at least one monitoring module is designed in such a way that it detects and evaluates the current on the, particularly respective, wheel speed sensor channel.

Preferably the blocking circuit comprises a power transistor, particularly a Mos-FET (metal-oxide semiconductor field effect transistor) the electric signal line of the wheel speed sensor channel extending through the drain source segment of said transistor. Hereby the blocking circuit can be realized in a very cost-effective manner and simply be integrated into circuits. In an especially preferred manner the blocking circuit comprises in addition to the power transistor also suitable electronic components in order to activate the transistor, in a most preferred manner a driver stage for activating a gate entry.

It is preferred that the at least one monitoring module is provided with a circuit for measuring the current and a circuit for evaluating the current, as well as a status driver stage generating an electric signal including the evaluation information with regard to the current. Said status driver stage in particular adopts only two statuses.

It is advisable that the circuit for measuring the current is provided with a shunt and/or at least one current comparator and/or at least one current mirror. The current is measured in particular permanently and/or at defined points of time.

Preferrably the circuit arrangement for measuring and/or evaluating the current is provided, at least in part, with at least one analog to digital converter, as e.g. a comparator.

It is advisable that the circuit for evaulating the current is provided with at least one filter and at least one comparator. In particular the filter is a low-pass filter in order to filter variations of the current value above a certain frequency. The comparator is provided in particular with three defined amplitude thresholds for the current, the first one defining the minimum admissible current which, if the value falls below this threshold, generates an error message. A second defined amplitude threshold corresponds with the usual amplitude of the wheel speed signal and a third defined amplitude threshold defines the maximum admissible current identifying an excess current, if the threshold value exceeded. In an especially preferred manner the comparator is provided with three transmission channels/signal lines to the electronic data processing unit (MCU), where a status signal for a value dropping below the defined current value is transmitted via a first transmission channel/signal line and via a second transmission channel/signal line the signal corresponding to the amplitude of the wheel speed signal and containing the wheel speed information and in particular additional information is transmitted. A third transmission channel/signal line being a status signal for exceeding the third defined amplitude threshold is connected to the status driver stage.

Preferably, one or more entries are automatically deactivated.

The circuit arrangement, in particular parts and/or certain circuit modules of the circuit arrangement, is preferably operated in a clocked manner. It is especially preferred to operate the monitoring module, and in a most preferred manner the circuit for measuring the current and/or the circuit for evaluating the current and/or the status driver stage in a clockwise manner.

It is advisable that the circuit arrangement for at least one wheel speed sensor channel is provided with a respective circuit for limiting the current which is in particular activated in such a manner that it is permanently operative. Especially preferred a semiconductor component, and in a most preferred manner a Mos-FET in the signal path of the wheel speed sensor channel, which is also used for limiting the current, is used for blocking the corresponding wheel speed sensor channel and/or is part of the blocking circuit of the circuit arrangement.

Preferably the circuit arrangement according to the present invention is part of the electronic power unit (PCU) of the electronic control device, in particular of a motor vehicle control device.

It is advisable that the circuit arrangement is connected to the electronic data processing unit (MCU) which in particular from a structural point of view is separated from the circuit arrangement and designed in such a manner as to execute programs. Herewith the functions of the circuit arrangement can also be activated by a control technique program executed in the electronic data processing unit (MCU). As far as the circuit arrangement is concerned, it can make available signals and data to the MCU.

It is preferred that the transmission channel/signal line of the status driver stage (St1,St2,St3,St4) and a status transmission channel/status line of the electronic data processing unit (MCU) are connected to an evaluation circuit, this evaluation circuit in particular being realized by an AND gate and being linked to at least one blocking circuit for blocking the at least one wheel speed sensor channel. This results in that the corresponding wheel speed sensor is blocked only when the circuit arrangement as well as the electronic data processing unit detect an excess current and/or the criteria defined on both sides are fulfilled which require a deactivation. In a particularly preferred manner the evaluation circuit is activated via the status transmission channel of the electronic data processing unit (MCU) and/or via the signal line of the status driver stage in such a way that the at least one blocking circuit does not block the corresponding wheel speed sensor channel. In this case it is especially preferred to deactivate a blocking of the at least one wheel speed sensor channel and/or to reactivate at least one wheel speed sensor.

Preferably the circuit arrangement is provided with a status driver stage for all wheel speed sensor channels. Thus a corresponding status signal is generated if an excess current is detected on at least one wheel speed sensor channel. In particular all wheel speed sensor channels are blocked correspondingly.

It is advisable that the circuit arrangement is designed in such a way that the at least one status driver stage is locked permanently when a status signal is generated which identifies an excess current fault, thus generating permanently the corresponding status signal. Consequently the information on a determined excess current fault is maintained and the reactivation of the wheel speed sensor is avoided in particular if the current amplitude falls below a defined critical value for a short period of time. It is particularly preferred that the status driver stage can be activated by the data processing unit (MCU) in such a way via an additional transmission channel, which is the most preferred manner, that the locking as well as the blocking of the wheel speed sensor channel is cancelled.

The circuit arrangement is preferably provided with at least one, particularly additional, transmission channel from the data processing unit (MCU) to the at least one status driver stage where the corresponding status driver stage can be activated via this transmission channel in such a manner that the corresponding status driver stage is unlocked and/or the corresponding status driver stage generates a status signal which does not identify an excess current fault. Hereby the corresponding blocking circuit is activated in a most preferred manner in such a way that the wheel speed sensor channel is not blocked and/or is enabled thus activating in a most preferred manner the corresponding wheel speed sensor.

It is preferred that the at least one circuit arrangement is provided as integrated circuit. Especially the at least one circuit arrangement is arranged on one or more chips. The at least one circuit arrangement is preferably arranged on a chip together with the electronic power unit (PCU) or as part of the latter, and in an especially preferred manner in addition to the electronic data processing unit (MCU).

It is advisable to complete the method in such a way that the electronic data processing unit (MCU) provides for activating and/or reactivating the at least one deactivated wheel speed sensor, in particular by that the electronic data processing unit (MCU) activates the at least one blocking circuit of the corresponding wheel speed sensor channel in such a way that the the wheel speed sensor channel is unblocked. In an especially preferred manner the reactivated wheel speed sensors are still monitored by that the at least one status signal of the corresponding status driver stage is evaluated by the electronic data processing unit (MCU) and that in case that the at least one status signal within at least one defined period of time and/or by means of a defined number of control cycles detects an excess current fault, the electronic data processing unit (MCU) deactivates the corresponding wheel speed sensor.

Preferably the circuit arrangement is designed in such a way that at least one blocked wheel speed sensor channel can be reactivated. This is achieved in particular by activating at least one digital signal line respectively a data bus of the electronic data processing unit (MCU) by means of a program. Consequently the controller software has to decide whether or not to reactivate the corresponding wheel speed sensor channel. Furthermore the controller software and/or the electronic data processing unit (MCU) thus gets information on the, in particular exact, moment of reactivation. This is important because the wheel speed sensors used in the motor vehicle show a specific activation behavior according to their construction. Without the information on the moment of activation, error functions may occur.

The present invention relates also to the utilization of the circuit arrangement and/or the method according to the invention in motor vehicles, in particular in a motor vehicle control unit.

The circuit arrangement according to the present invention as well as the method according to the present invention are suited for monitoring the current of a wheel speed sensor channel and the blocking of the wheel speed sensor channel in case of an excess current. The circuit is especially suited for being integrated into integrated circuits.

From the following description of an embodiment on the basis of a figure, further preferred arrangements can be derived.

BRIEF DESCRIPTION OF THE DRAWING

It is shown schematically in
FIG. 1 the connection of the four wheel speed sensors to one circuit arrangement each for detecting and avoiding excess current faults on the corresponding wheel speed sensor channel, as well as the schematic structure of these circuit arrangements and the connection to the electronic data processing unit (MCU).

DETAILED DESCRIPTION OF THE DRAWING

FIG. 1 shows an embodiment in which four wheel speed sensors S1,S2,S3,S4, according to the example, are connected to one respective circuit arrangement 2,3,4,5 via the corresponding wheel speed sensor channels 6,7,8,9. Circuit arrangement 2,3,4,5 is provided with one respective blocking circuit 10,11,12,13 with one Mos-FET each, the corresponding wheel speed sensor channel 6,7,8,9 resp. the corresponding signal line extending through the drain source segment of the transistor, and a driver stage for activating this Mos-FET. Additionally, the circuit arrangements 2,3,4,5 comprise one monitoring module U1,U2,U3,U4 being provided with one circuit each for measuring the current M1,M2,M3,M4, one status driver stage St1,St2,St3,St4 and a circuit for evaluating the current B1,B2,B3,B4. This circuit for evaluating the current B1,B2,B3,B4 comprises one filter F1,F2,F3,F4 and a comparator K1,K2,K3,K4 each. According to the example, the wheel speed signal of the wheel speed sensor S1 is transmitted to circuit arrangement 2 via the wheel speed sensor channel 6. The wheel speed sensor channel 6 extends through blocking circuit 10 within the circuit arrangement 2, the Mos FET of the blocking circuit lying in the signal path of the signal line of the wheel speed sensor channel 6. Wheel speed sensor channel 6 is connected to the circuit for measuring current M1, in which the current of the wheel speed sensor channel 6 is measured and transmitted to filter F1, in order to filter short current peak loads and high-frequency parts. This filtered signal is transmitted to comparator K1 which evaluates the signal with regard to two signal thresholds and from which three transmission channels L1,L2,L3 start, as described in the example. A first threshold defines a minimum current, where the current indicated to the MCU via the transmission channel L1 is too low if this threshold is not reached. The second threshold defines a maximum current where in case this threshold is exceeded, status driver stage St1 is activated via transmission channel L3 which generates a status signal identifying an excess current. This status signal is transmitted to the MCU via the transmission channel L4. The filtered signal the amplitude of which lying above the first threshold and below the second threshold, is transmitted to the MCU via the transmission channel L2, comprising the wheel speed information and additional information. The MCU evaluates the status signal from transmission channel L4 identifying an excess current in presence of the value of "1" (high level). In presence of a value of "1", a counter counts a defined number of control cycles. The MCU detects the occurence of an excess current in a valid manner only if this counter counts a defined number of control cycles and transmission channel L4 permanently detects a value of "1". In this case the MCU activates in particular the warning lamp of at least one motor vehicle control system leaving an error message in the memory. Furthermore the MCU releases the deactivation of the corresponding wheel speed sensor resp. the blocking of the corresponding wheel speed sensor channel. In this case the MCU generates a further status signal of "1" which is transmitted to circuit arrangement 2 via transmission channel L5. There this signal from transmission channel L5 and the signal from transmission channel L4 which is branched for this reason, is present on an AND gate activating the driver stage of blocking circuit 10, whereby the Mos-FET of blocking circuit 10 is put into a highly resistive status and/or this Mos-FET blocks. If necessary, the MCU can reactivate the wheel speed sensor S1 via transmission channel L5 by transmitting a value of "0" to the AND gate via the transmission channel 5, thus activating the driver of blocking circuit 10 in such a way that the wheel speed sensor channel 6 is unblocked.

The circuit arrangements 2,3,4,5 are part of the electronic power unit (PCU) 1 of a motor vehicle control device.

According to another embodiment, which is not described, the circuit arrangement comprises the corresponding circuit elements and signal lines and/or transmission channels for all wheel speed sensors and alternatively there are two circuit arrangements comprising the corresponding circuit elements for two wheel speed sensors each.

The invention claimed is:

1. A circuit arrangement (2,3,4,5) in an electronic control device which is connected to at least one wheel speed sensor channel (6,7,8,9) transmitting wheel speed information, the arrangement comprising:
   at least one monitoring module (U1,U2,U3,U4) for the at least one wheel speed sensor channel (6,7,8,9), said at least one monitoring module (U1,U2,U3,U4) capable of monitoring an excess current fault on at least one wheel speed sensor channel (6,7,8,9), wherein the at least one monitoring module (U1,U2,U3,U4) detects an excess current fault, the corresponding wheel speed sensor channels (6,7,8,9) is blocked by a blocking circuit (10,11,12,13) of the circuit arrangement (2,3,4,5), or that the circuit arrangement (2,3,4,5) provides for blocking the corresponding wheel speed sensor channel(s) (6,7,8,9) from outside the circuit arrangement (2,3,4,5);
   wherein the circuit arrangement is connected to an electronic data processing unit (MCU) which, in particular from a structural point of view, is separated from the circuit arrangement (2,3,4,5) and is designed for executing programs; and
   wherein a transmission channel/a signal line of the status driver stage (St1,St2,St3,St4) and one status transmission channel/one status line of the electronic data processing unit (MCU) are connected to an evaluation circuit, in which case the evaluation circuit is realized in particular by an AND gate and is linked to at least one blocking circuit (10,11,12,13) for blocking the at least one wheel speed sensor channel (6,7,8,9).

2. A circuit arrangement (2,3,4,5) according to claim 1, wherein the at least one monitoring module (U1,U2,U3,U4) is designed in such a manner that it detects and evaluates the current on the wheel speed sensor channel (6,7,8,9).

3. A circuit arrangement (2,3,4,5) according to claim 1, wherein the blocking circuit (10,11,12,13) comprises one, in particular additional power transistor, the electric signal line of the wheel speed sensor channel (6,7,8,9) extending through the drain source segment of this transistor.

4. A circuit arrangement (2,3,4,5) according to claim 1, wherein the at least one monitoring module (U1,U2,U3,U4) is provided with a circuit for measuring the current (M1,M2,M3,M4) and a circuit for evaluating the current (B1,B2,B3,B4) as well as the status driver stage (St1,St2,St3,St4) generating an electric signal which comprises the evaluation information with regard to the current.

5. A circuit arrangement (2,3,4,5) according to claim 1, wherein the circuit for evaluating the current (B1,B2,B3,B4) is provided with at least one filter (F1,F2,F3,F4) and at least one comparator (K1,K2,K3,K4).

6. A circuit arrangement (2,3,4,5) according to claim 1, wherein the circuit arrangement is designed in such a way that the at least one status driver stage (St1,St2,St3,St4) locks permanently when a status signal is generated which identifies an excess current fault, thus generating permanently the corresponding status signal.

7. A control device comprising:
   a plurality of wheel speed sensor channels (6,7,8,9);
   a plurality of circuit arrangements, wherein each of the plurality of circuit arrangements are connectable to a wheel speed sensor with one of the plurality of wheel speed sensor channels (6,7,8,9), and wherein the plurality of circuit arrangements each includes;
   a monitoring module; and a blocking circuit connected to the monitoring module and the corresponding one of the wheel speed sensor channels (6,7,8,9); and a data processing unit connected to the plurality of circuit arrangements such that the blocking module is operable to block a current from reaching the data processing unit based upon an output from the monitoring module.

8. The control device of claim 7, wherein the monitoring module comprises:

a current measuring circuit connected to the corresponding one of the plurality of wheel speed sensor channels (6,7,8,9);

a current evaluating circuit connected to the current measuring circuit, where the current evaluating circuit includes a filter and a comparator; and a status driver stage, wherein the status driver stage is connected to the comparator and the to the blocking circuit.

9. The control device of claim 8, wherein the status driver stage (St1,St2,St3,St4) generates an electric signal which comprises the current evaluation information for the monitoring module.

10. The control device of claim 8, wherein one of a transmission channel and a signal line of the status driver stage (St1,St2,St3,St4) and one of a status transmission channel and status line of the electronic data processing unit (MCU) are connected to an evaluation circuit, and wherein the evaluation circuit includes an AND gate and is linked to the blocking circuit (10,11,12,13) for blocking one of the plurality of wheel speed sensor channels (6,7,8,9).

11. The control device of claim 7, wherein the status driver stage (St1,St2,St3,St4) is locked when a status signal, which identifies an excess current fault is generated, to permanently generate the corresponding status signal from the.

12. The control device of claim 7, wherein the electronic data processing unit (MCU) is structurally separated from the circuit arrangement (2,3,4,5).

13. The control device of claim 7, wherein the blocking circuit (10,11,12,13) comprises a power transistor, and wherein an electric signal line of the wheel speed sensor channel (6,7,8,9) extends through a drain source segment of the transistor.

14. The control device of claim 7, wherein the monitoring module (U1,U2,U3,U4) detects and evaluates the current on the corresponding one of the plurality of wheel speed sensor channels (6,7,8,9).

* * * * *